United States Patent [19]

Matsushige

[11] Patent Number: 5,661,478
[45] Date of Patent: Aug. 26, 1997

[54] CONVERSION BETWEEN ANALOGUE AND DIGITAL SIGNALS

[75] Inventor: Takashi Matsushige, Stanton Harcourt, United Kingdom

[73] Assignees: Sony Corporation, Tokyo, Japan; Sony United Kingdom Limited, Weybridge, England

[21] Appl. No.: 528,040

[22] Filed: Sep. 14, 1995

[30] Foreign Application Priority Data

Sep. 15, 1994 [GB] United Kingdom .................. 9418608

[51] Int. Cl.$^6$ .............................. G11B 27/30; G11B 5/00
[52] U.S. Cl. .............................. 341/61; 341/144; 341/155; 364/724.1
[58] Field of Search .............................. 341/61, 144, 155; 364/724.01, 723

[56] References Cited

U.S. PATENT DOCUMENTS

| | | | |
|---|---|---|---|
| 4,853,797 | 8/1989 | Yamada et al. | 360/32 |
| 5,197,101 | 3/1993 | Mok . | |
| 5,276,557 | 1/1994 | Nagashima et al. . | |
| 5,559,513 | 9/1996 | Rothermel et al. | 341/61 |
| 5,561,424 | 10/1996 | Norsworthy et al. | 341/126 |

FOREIGN PATENT DOCUMENTS

| | | |
|---|---|---|
| 0 101 301 | 2/1984 | European Pat. Off. . |
| 0 152 142 | 8/1985 | European Pat. Off. . |
| 2 240 656 | 8/1991 | United Kingdom . |
| 2 247 370 | 2/1992 | United Kingdom . |
| 2 246 921 | 2/1992 | United Kingdom . |

*Primary Examiner*—Jeffrey A. Gaffin
*Assistant Examiner*—Peguy JeanPierre
*Attorney, Agent, or Firm*—William S. Frommer; Alvin Sinderbrand

[57] ABSTRACT

Analogue to digital (A/D) and digital to analogue (D/A) converters perform the required conversion at a higher sampling rate (e.g. 64Fs) and a lower resolution (e.g. 1 to 4 bits) than the actual sampling rate (Fs) and resolution (e.g. 16 bits) of the required digital signal. The oversampled low resolution signal is generated by oversampling the input digital signal (for D/A conversion) or is decimated to generate the required output digital signal (for A/D conversion). The oversampling or decimation filters are switchable between two modes of operation, in which different signal delays are imposed by the filter. Thus a lower quality, but shorter delay, filter can be used in converters in the signal path for an artist's foldback signal. This can reduce the subjectively disturbing effects of long conversion delays in the foldback signal path.

13 Claims, 2 Drawing Sheets

CONVERSION BETWEEN ANALOGUE AND DIGITAL SIGNALS

BACKGROUND OF THE INVENTION

1. Field of the Invention

This invention relates to conversion between analogue and digital signals. In particular, this invention relates to analogue to digital converters, digital to analogue converters, and digital audio processing apparatus incorporating such converters.

2. Description of the Prior Art

Analogue to digital (A/D) and digital to analogue (D/A) converters are used to convert between analogue and digital representations of a signal such as a digital audio signal.

One application of A/D and D/A converters is in a digital audio processing apparatus such as a digital audio mixing console. In this type of apparatus, analogue signals from audio sources (e.g. microphones or guitars) are converted by respective A/D converters into sampled digital audio signals. The digital audio signals (possibly together with further directly generated digital audio signals, for example from a digital synthesizer) are then mixed or combined in the mixing console using entirely digital techniques such as digital filtering. The resulting digital audio signals are then either converted back to the analogue domain by a D/A converter (to be heard by an audience, the artist or a mixing engineer) or recorded (for later D/A conversion).

A recently adopted technique in A/D and D/A conversion is to perform the conversion at a low resolution (e.g. 1 to 4 bits) but at a sampling rate (e.g. 64 Fs) which is many times greater than the actual sapling rate (Fs) of the required digital signal. The technique is described in the book "Digital Signal Processing" (Proakis and Manolakis, Macmillan Publishing, 1992). In an A/D converter using this technique, a digital filter is then used to decimate the 64 Fs signal to generate the required digital signal at the lower sampling rate (Fs) but a much higher resolution (e.g. 16 bits). A corresponding D/A converter uses an interpolation filter to oversample a high resolution Fs signal up to a low resolution 64 Fs signal before the oversampled low resolution signal is converted to an analogue signal.

It has been recognised that particularly faithful conversion between digital and analogue audio signals can be achieved using A/D and D/A converters of the type described above incorporating so-called linear phase response digital filters. These filters are described in the book referred to above. However, a disadvantage of linear phase response filters in some circumstances is the relatively long delay which they impose on the conversion process. This delay, which is of the order of about 2 mS (milliseconds) per conversion stage, can mean that a foldback audio signal played from the digital mixing console to an artist during a recording session or performance can be heavily delayed with respect to the artist's own voice or instrument. This delay (e.g. 4 mS) can be subjectively disturbing for the artist.

SUMMARY OF THE INVENTION

This invention provides a digital to analogue converter for converting an input digital signal having an input sampling rate and an input resolution to an output analogue signal, the converter comprising:

filter means for oversampling the input digital signal to form an intermediate digital signal having a sampling rate higher than the input sampling rate and a resolution lower than the input resolution; and means for converting the intermediate digital signal into the output analogue signal;

in which the filter means is selectively operable in at least a first operation mode and a second operation mode, the filter means imposing a lower signal delay in the second operation mode than in the first operation mode.

This invention also provides a corresponding analogue to digital converter for converting an input analogue signal to an output digital signal having an output sampling rate and an output resolution, the converter comprising:

means for converting the input analogue signal to form an intermediate digital signal having a sampling rate higher than the output sampling rate and a resolution lower than the output resolution; and filter means for decimating the intermediate digital signal to generate the output digital signal;

in which the filter means is selectively operable in at least a first operation mode and a second operation mode, the filter means imposing a lower signal delay in the second operation mode than in the first operation mode.

The D/A and A/D converters according to the invention are switchable between operation at at least two different signal delays. This allows a longer delay to be accepted in situations where higher conversion quality is of most importance, and a lower delay (though with a possible corresponding deterioration in conversion quality) to be used where conversion speed is the most important feature (e.g. in artists' foldback channels).

Preferably the filter means is also adjustable to allow conversion to take place to or from two or more possible sampling rates of the output (input) digital signal. Accordingly, in the case of a D/A converter, it is preferred that the filter means is selectively operable to oversample the input digital signal by at least either a first or a second oversampling factor, thereby generating the intermediate digital signal from input digital signal having a first or a second input sampling rate respectively. Similarly, in the case of an A/D converter, it is preferred that the filter means is selectively operable to decimate the intermediate digital signal by at least either a first or a second decimation factor, thereby generating the output digital signal with a first or a second output sampling rate respectively.

In order that the converters can work at a single- or double-speed sampling rate (i.e. Fs or 2 Fs), it is preferred that in the D/A converter the first oversampling factor is double the second oversampling factor, and in the A/D converter the first decimation factor is double the second decimation factor.

Preferably the filter means operates as a substantially linear phase response filter in the first operation mode.

Preferably the filter means operates as a substantially minimum phase response filter in the second operation mode.

Although two or more separate filters could be used, with data being routed to an appropriate filter depending on the current operating mode of the filter means, it is preferred that the filter means comprises a memory for holding a current set of filter coefficients, the converter comprises means for storing in the memory at least either a first set of filter coefficients for operation in the first operation mode or a second set of filter coefficients for operation in the second operation mode. This arrangement means that only one set of filter hardware is required.

Converters according to the invention are particularly suitable for use in digital audio processing apparatus such as a digital mixing console.

This invention also provides digital audio processing apparatus for processing a plurality of audio channels, the apparatus being operable in at least:

(i) a first operation mode in which $N_1$ channels are processed at a sample rate of $Fs_1$; and (ii) a second operation mode in which $N_2$ channels are processed at a sample rate of $Fs_2$;

where the product of $N_1$ and $Fs_1$ is substantially equal to the product of $N_2$ and $Fs_2$.

This aspect of the invention provides an apparatus which is conveniently switchable between operation at two or more different sample rates. The processing and communication bandwidth of the apparatus is used effectively at each sample rate by decreasing the number of audio channels which are processed in proportion to an increased sample rate.

Although various ratios of $Fs_1$ and $Fs_2$ could be used, it is preferred that the apparatus selectively operates at either a single- or a double-speed sampling rate. Accordingly, it is preferred that $N_1=2N_2$; and $Fs_1=½Fs_2$. In this arrangement, one double-speed channel can be conveniently multiplexed to replace two single-speed channels.

Although various sampling rates could be used, it is preferred that the apparatus is compatible with widely recognised standard sampling rates. Accordingly, it is preferred that $Fs_1$ is selected from the group consisting of 44.1 kHz and 48 kHz.

BRIEF DESCRIPTION OF THE DRAWINGS

The above and other objects, features and advantages of the invention will be apparent from the following detailed description of illustrative embodiments which is to be mad in connection with the accompanying drawings, in which.

DESCRIPTION OF THE PREFERRED EMBODIMENTS

Figure 1:
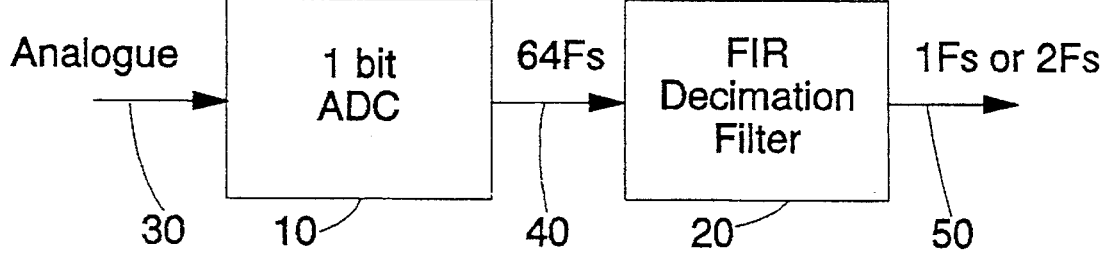
FIG. 1 is a schematic block diagram of an analogue to digital converter.

FIG. 1 is a schematic diagram of an analogue-to-digital (A/D) converter comprising a low resolution (in this case 1 bit) oversampling converter 10 and a finite impulse response (FIR) digital decimation filter 20.

The oversampling converter 10 receives an analogue signal 30 and generates a digitised version of that analogue signal at a very high sampling rate but a low resolution. This highly oversampled intermediate signal 40 is passed to the FIR decimation filter 20 in which it is decimated to generate an output digital signal 50 having a much lower sampling rate than the intermediate digital signal 40 but a much higher resolution than the signal 40.

In the present example, the oversampling converter 10 generates the intermediate signal 40 with a resolution of 1 bit and a sampling rate 64 Fs, where Fs is 48 kHz. This means that the sample rate of the intermediate signal 40 is 3.072 MHz. The FIR decimation filter 20 decimates the intermediate signal 40 to generate the output signal 50 having a resolution of 16 bits and a sample rate of either Fs or 2 Fs (48 kHz or 96 kHz). Similar calculations apply for an alternative example in which the base sample rate Fs is 44.1 kHz.

The FIR decimation filter 20 is constructed using a programmable digital filter device such as one of the Motorola DSP56000 family of devices. These devices comprise the hardware required to implement an FIR filter, with the actual filter characteristics being determined by a small amount of software running on the device and a set of filter coefficients held in the device's memory. These devices are described in the book "Implementing IIR/FIR Filters with Motorola's DSP56000/DSP56001" (Lane and Hillman, Motorola, 1993).

The FIR decimation filter 20 is switchable between various different filter characteristics by changing the filter coefficients used. In particular, the filter is switchable between sets of coefficients giving decimation factors of 32 and 64, so that the output signal 50 has a sampling rate of either 1 Fs or 2 Fs. The FIR decimation filter 20 is also switchable between coefficients giving operation as a linear phase response filter and coefficients giving operation as a minimum phase response filter. Accordingly, the FIR decimation filter 20 may have any permutation of the two decimation factors and the two filter characteristics described above. (In other embodiments, more than two possibilities for the decimation factor and/or filter characteristic could be allowed).

The changed of coefficients is achieved by loading a replacement set of coefficients from a read-only memory (ROM—not shown) into the filter device's internal random access memory (RAM—not shown). In alternative embodiments, the filter device could access the coefficients directly from external ROM or multiple filter devices could be employed, with the intermediate signal 40 being routed to the appropriate device for the required characteristics and decimation factor.

Figure 2:
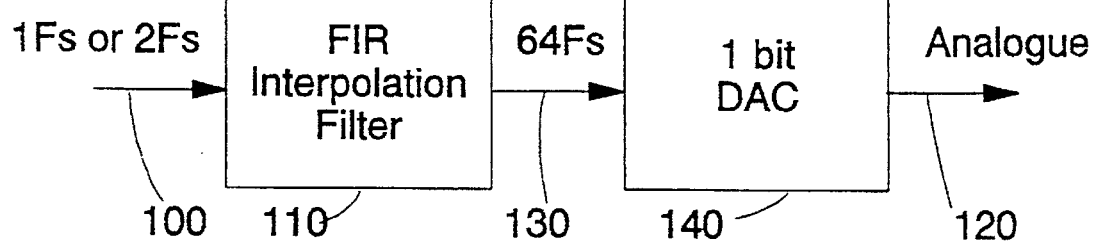
FIG. 2 is a schematic block diagram of a digital to analogue converter.

FIG. 2 is a schematic block diagram of a complementary digital-to-analogue converter which receives an input signal 100 having a sample rate of 1 Fs or 2 Fs and generates an output analogue signal 120. The input signal 100 is passed first to an FIR interpolation filter 110 which interpolates the input signal by an interpolation factor of either 32 or 64 (for 2 Fs or 1 Fs operation respectively) to generate an intermediate signal 130 which is oversampled at 64 Fs. The intermediate signal 130 is then converted by a low resolution (1 bit) oversampled converter 140 to generate the output analogue signal 120.

As in the case of the FIR decimation filter 20, the FIR interpolation filter 110 is switchable between two or more interpolation factors (in this case, 32 or 64) and two or more filter characteristics (in this case, a linear phase response and a minimum phase response characteristic).

In other embodiments, the converter 10 or the converter 140 could convert to (from) an intermediate signal having a resolution of, for example, 2,4,8 or 16 bits and a sample rate of, for example, 8, 16, 32 or 128 Fs. In each case, the intermediate signal resolution is lower than the input (output) resolution and the intermediate signal sampling rate is higher than the input (output) sampling rate.

The skilled man will appreciate that the terms "linear phase response" and "minimum phase response" are used in the art to describe filter characteristics which offer a substantially linear phase response or a substantially minimum phase response respectively. The terms do not necessarily imply exact linearity or an exact minimum phase response.

Figure 3:
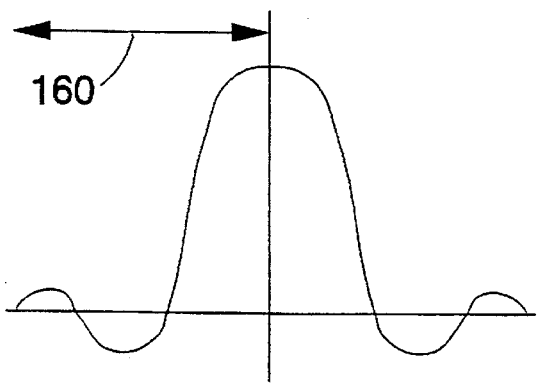
FIG. 3 is a schematic diagram illustrating the impulse response of a linear phase response filter.

FIG. 3 is a schematic diagram illustrating the impulse response of a linear phase response filter. This impulse response is symmetrical and imparts a delay 160 to digital signals processed by the filter. The delay 160 is of the order of 2 mS. It has been found that although the delay of a linear phase response filter can be disadvantageous in some circumstances, this type of filter provides a converter which gives particularly faithful reproduction of the signal to be converter.

Figure 4:
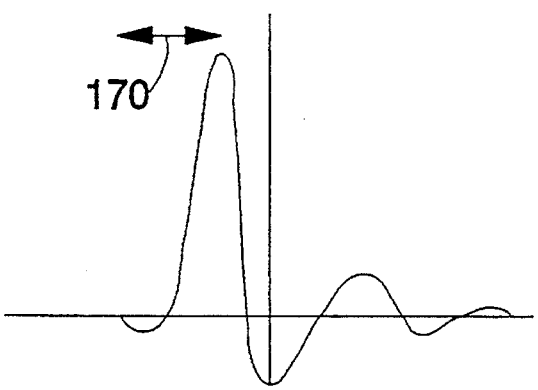
FIG. 4 is a schematic diagram illustrating the impulse response of a minimum phase response filter.

FIG. 4 is a schematic diagram illustrating the impulse response of a minimum phase response filter. These filters (for the same tap length) give a much shorter average signal delay 170, of the order of 0.5 mS, but at the expense of a slightly less faithful reproduction of the signal to be converted.

In summary therefore the converters of FIGS. 1 and 2 are switchable between operation at at least two sampling rates and operation at at least two signal delays. It is quite straightforward to switch between these different modes of operation, simply requiring new filter coefficients to be loaded into or accessed by the filter device.

Figure 5:
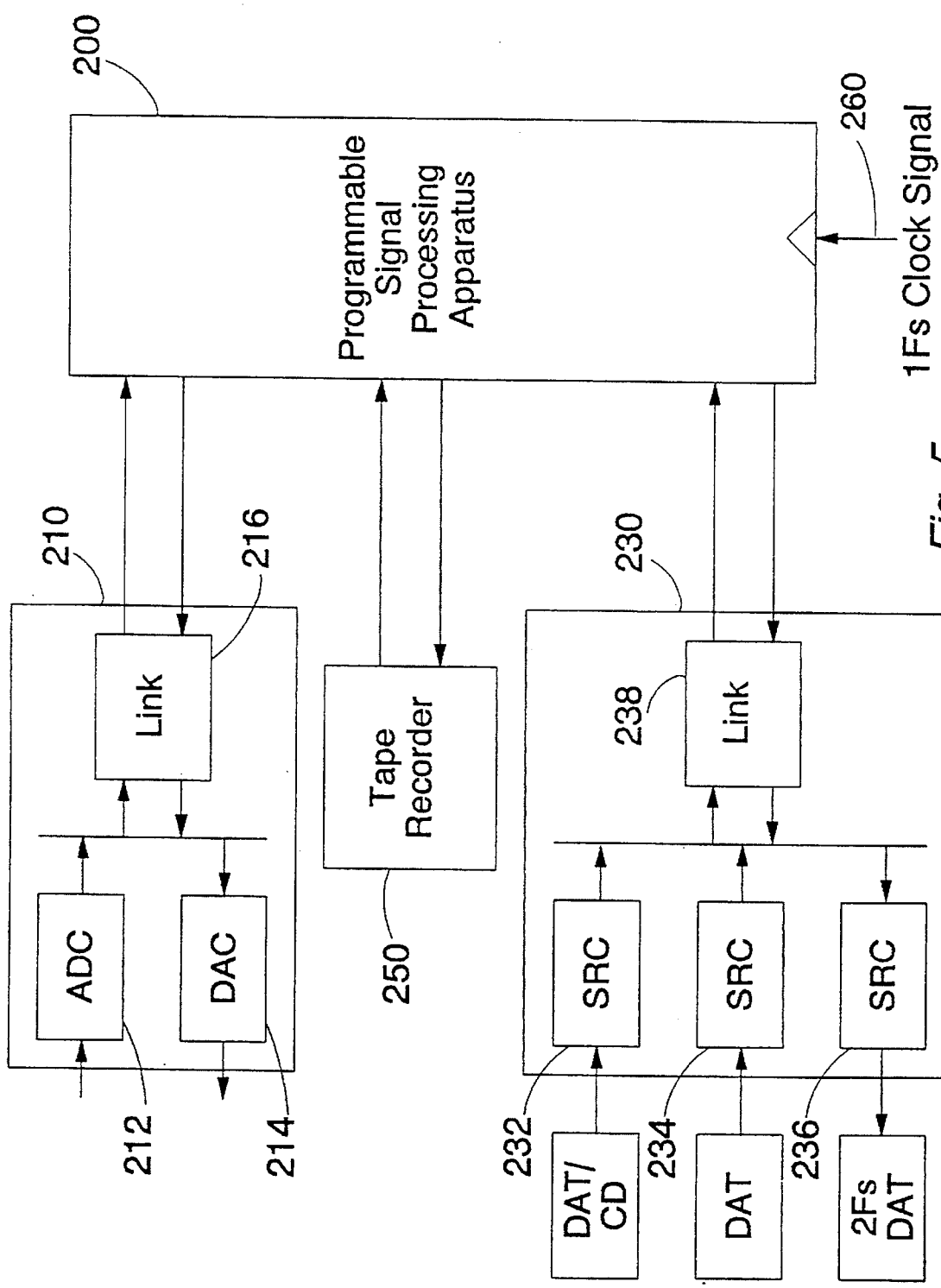
FIG. 5 is a schematic block diagram of a digital audio processing apparatus.

FIG. 5 is a schematic diagram of a digital audio processing apparatus comprising a programmable signal processing apparatus 200, analogue input/output (I/O) apparatus 210, digital I/O apparatus 230 and a digital tape recorder 250, all interconnected by data communication buses. The apparatus of FIG. 5 may be embodied as, for example, a digital mixing console which receives a number of audio channels in digital or analogue form, processes the channels digitally, and generates a number of audio output signals, again in digital or analogue form.

The analogue I/O apparatus 210 comprises one or more A/D converters 212 of the type illustrated in FIG. 1, one or more D/A converters 214 of the type illustrated in FIG. 2 and a link device 216 which handles digital communication to and from the ND converters 212 and the D/A converters 214. The A/D converters 212 are connected to receive analogue audio signals from sources such as microphones, guitars, keyboards, etc. These are converted into digital signals and passed via the link 216 to the programmable signal processing apparatus 200. Similarly, signals to be output in analogue form are passed from the programmable signal processing apparatus 200, via the link device 216 to one of the D/A converters 214 where they are converted to corresponding analogue signals.

The digital I/O apparatus 230 comprises a plurality of sample rate converters (SRC) 232, 234, 236, all of which communicate with the programmable signal processing apparatus 200 via a link device 238. The sample rate converters 232, 234 are connected to receive incoming digital audio data from sources such as digital audio tape (DAT) or compact disc (CD). Where necessary, the digital signals received from these sources are sample rate converted to the current operating sample rate of the apparatus of FIG. 5. The sample rate converter 236 receives digital audio to be output onto a digital audio tape running at 2 Fs (where Fs is 44.1 kHz or 48 kHz). Where necessary, the SRC 236 sample rate converts the data to be output to the 2 Fs DAT.

The programmable signal processing apparatus comprises a powerful parallel data processing apparatus operating under the control of a current operating programme and in synchronism with a clock signal at a clock speed of 1 Fs. However, the apparatus of FIG. 5 is switchable between operation at 1 Fs and operation at 2 Fs, with the clock signal 260 remaining at 1 Fs throughout.

When the apparatus is switched from operation at 1 Fs to operation at 2 Fs, the A/D converters 212 and the D/A converters 214 are switched by changing their coefficients as described. The link device 216 multiplexes one 2 Fs channel onto the communication bandwidth or hardware previously used for two 1 Fs channels. The tape recorder 250 records half as many 2 Fs channels as its capacity for 1 Fs channels. Finally, the link device 238 also multiplexes one 2 Fs channel onto the communication bandwidth or hardware previously used to handle two 1 Fs channels.

The sample rate converters 232, 234 and 236 are switched to convert to and from 2 Fs, rather than converting to and from 1 Fs.

The programmable signal processing apparatus is used to process audio data having a sample rate of 2 Fs, even though its clock speed does not change from 1 Fs. The reasons why the clock speed does not change are two-fold:

(i) The apparatus 200 only needs to handle half as many channels at 2 Fs, because the communication bandwidth and hardware between the link devices and the apparatus 200 has a fixed capacity as described above; and (ii) In general, apparatus such as the apparatus 200 is constructed to operate at its maximum possible speed under normal circumstances. If the apparatus could be run twice as fast, this would probably become the normal mode of operation of the apparatus.

When the apparatus of FIG. 5 is running at a sample rate of 2 Fs, the various filtering and processing operations to be carried out by the programmable signal processing apparatus 200 are now carried out in parallel on two samples of the 2 Fs signals in every 1 Fs sample period of the dock 260. This change is achieved by changing the operating software of the apparatus 200.

Finally, the filter characteristics of the A/D converters 212 and the D/A converters 214 are changed in dependence on the function of the signals being handled by those converters. In particular, the characteristics are changed to a substantially linear phase response when the signals being handled by the converters are not intended for sole use as artist's foldback signals. Where the signals are to be used purely as foldback for the artist, the filter characteristics are changed to a substantially minimum phase response characteristic in order to reduce the signal delay imparted to those signals. This alleviates the subjectively disturbing delay applied to the artist's foldback signals by the use of a digital mixing console.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A digital to analogue converter for converting an input digital signal having an input sampling rate and an input resolution to an output analogue signal, said converter comprising:

filter means for oversampling said input digital signal to form an intermediate digital signal having a sampling rate higher than said input sampling rate and a resolution lower than said input resolution; and means for converting said intermediate digital signal into said output analogue signal;

in which said filter means is selectively operable in at least a first operation mode in which said filter means operates as a substantially linear phase response filter and a second operation mode in which said filter means operates as a substantially minimum phase response filter, said filter means imposing a lower signal delay in said second operation mode than in said first operation mode.

2. A digital to analogue converter according to claim 1, in which said filter means is selectively operable to oversample said input digital signal by at least either a first or a second oversampling factor, thereby generating said intermediate digital signal from input digital signal having a first or a second input sampling rate respectively.

3. A digital to analogue converter according to claim 2, in which said first oversampling factor is double said second oversampling factor.

4. A digital to analogue converter according to claim 1, in which:

said filter means comprises a memory for holding a current set of filter coefficients; and said converter comprises means for storing in said memory at least either a first set of filter coefficients for operation in said first operation mode or a second set of filter coefficients for operation in said second operation mode.

5. Digital audio processing apparatus comprising a digital to analogue converter according to claim 1.

6. An analogue to digital converter for converting an input analogue signal to an output digital signal having an output sampling rate and an output resolution, said converter comprising:

means for converting said input analogue signal to form an intermediate digital signal having a sampling rate higher than said output sampling rate and a resolution lower than said output resolution; and filter means for decimating said intermediate digital signal to generate said output digital signal;

in which said filter means is selectively operable in at least a first operation mode in which said filter means operates as a substantially linear phase response filter and a second operation mode in which said filter means operates as a substantially minimum phase response filter, said filter means imposing a lower signal delay in said second operation mode than in said first operation mode.

7. An analogue to digital converter according to claim 6, in which said filter means is selectively operable to decimate said intermediate digital signal by at least either a first or a second decimation factor, thereby generating said output digital signal with a first or a second output sampling rate respectively.

8. An analogue to digital converter according to claim 7, in which said first decimation factor is double said second decimation factor.

9. An analogue to digital converter according to claim 6, in which:

said filter means comprises a memory for holding a current set of filter coefficients; and said converter comprises means for storing in said memory at least either a first set of filter coefficients for operation in said first operation mode or a second set of filter coefficients for operation in said second operation mode.

10. Digital audio processing apparatus comprising an analogue to digital converter according to claim 6.

11. Digital audio processing apparatus for processing a plurality of audio channels having at least one of (a) a digital to analog converter having first filter means for oversampling an input digital signal to form an intermediate digital signal having a sampling rate higher than an input sampling rate and a resolution lower than an input resolution and means for converting said intermediate digital signal into an output analog signal in which said first filter means operates as a substantially linear phase response filter in one mode and operates as a substantially minimum phase response filter in another mode and (b) an analog to digital converter having means for converting an input analog signal to form an intermediate digital signal having a sampling rate higher than an output sampling rate and a resolution lower than an output resolution and second filter means for decimating said intermediate digital signal to generate an output digital signal in which said second filter means operates as a substantially linear phase response filter in one mode and operates as a substantially minimum phase response filter in another mode, said apparatus being operable in at least:

(i) a first operation mode in which $N_1$ channels are processed at a sample rate of $FS_1$; and (ii) a second operation mode in which $N_2$ channels are processed at a sample rate of $FS_2$;

where the product of $N_1$ and $FS_1$ is substantially equal to the product of $N_2$ and $FS_2$.

12. Apparatus according to claim 11, in which:

$N_1=2N_2$; and $FS_1=\frac{1}{2}FS_2$.

13. Apparatus according to claim 12, in which $Fs_1$ is selected from the group consisting of 44.1 kHz and 48 kHz.

* * * * *